United States Patent
Awasthi (10) Patent No.: US 10,713,660 B2
(45) Date of Patent: Jul. 14, 2020

(54) AUTHORIZATION OF CREDENTIAL ON FILE TRANSACTIONS

(71) Applicant: Visa International Service Association, San Francisco, CA (US)

(72) Inventor: Amitabh Awasthi, Foster City, CA (US)

(73) Assignee: VISA INTERNATIONAL SERVICE ASSOCIATION, San Francisco, CA (US)

(*) Notice: Subject to any disclaimer, the term of this patent is extended or adjusted under 35 U.S.C. 154(b) by 525 days.

(21) Appl. No.: 15/265,576

(22) Filed: Sep. 14, 2016

(65) Prior Publication Data
US 2017/0076288 A1  Mar. 16, 2017

Related U.S. Application Data (60) Provisional application No. 62/219,078, filed on Sep. 15, 2015.

(51) Int. Cl.
*G06Q 20/40* (2012.01)
*G06Q 20/38* (2012.01)

(52) U.S. Cl.
CPC ....... *G06Q 20/405* (2013.01); *G06Q 20/3821* (2013.01); *H04L 2463/102* (2013.01)

(58) Field of Classification Search
CPC .............. G06Q 20/405; G06Q 20/3821; H04L 2463/102
See application file for complete search history.

(56) References Cited

U.S. PATENT DOCUMENTS

| | | | |
|---|---|---|---|
| 2004/0073688 A1* | 4/2004 | Sampson | G06Q 20/02 709/229 |
| 2011/0022517 A1 | 1/2011 | Hammad | |
| 2015/0058227 A1* | 2/2015 | Dua | G06Q 20/32 705/67 |
| 2015/0066651 A1* | 3/2015 | Hu | G06Q 20/20 705/14.65 |
| 2015/0170149 A1* | 6/2015 | Sharma | G06Q 20/3224 705/44 |
| 2015/0227929 A1* | 8/2015 | Anand | G06Q 20/40 705/44 |
| 2016/0125405 A1* | 5/2016 | Alterman | G06Q 20/385 705/44 |
| 2016/0335634 A1* | 11/2016 | Flood | G06Q 20/409 |

* cited by examiner

*Primary Examiner* — Robert R Niquette
(74) *Attorney, Agent, or Firm* — Kilpatrick Townsend & Stockton LLP (57) ABSTRACT

A user may establish a relationship with a merchant so that the user can conduct repeated transactions with the merchant. The merchant computer associated with the merchant may store credentials associated with the user's account. The repeated transactions may not occur at regular intervals. The merchant may include an indicator in the authorization request messages for the user's transactions that indicates that the user is part of the established relationship. Hence, other entities that receive the indicator can accordingly identify and process the transaction as low risk, which results in higher approvals of the user's transactions conducted with the merchant.

20 Claims, 4 Drawing Sheets

| Account identifier 401 | Credential on file indicator 402 | Transaction data 403 | Reason code 404 | Transaction environment code 405 |

AUTHORIZATION OF CREDENTIAL ON FILE TRANSACTIONS

CROSS-REFERENCES TO RELATED APPLICATIONS

This application is a non-provisional of and claims the benefit of priority to U.S. Provisional Application No. 62/219,078, filed Sep. 15, 2015, which is hereby incorporated by reference in its entirety for all purposes.

BACKGROUND

Currently, transaction processing systems recognize recurring transactions as those that represent relationships between a cardholder and a merchant to purchase goods or services over predetermined regular intervals. Typically these transactions also have similar transaction amounts. However, the growth of digital commerce has increased the types of repeated transactions conducted by a cardholder and a merchant, including those that that are not restricted to these conditions. Yet, since such transactions cannot be differentiated, it is not possible to perform specific processing for them. This can result in an inefficient use of computing resources. As the number of electronic transactions that are processed continues to increase, there is a greater need to process these transactions efficiently.

Embodiments of the invention address this and other problems, individually and collectively.

BRIEF SUMMARY

Embodiments of the present invention are related to systems and methods for identifying, tracking, and analyzing credential on file transactions.

One embodiment of the invention is directed to a method performed by a server computer. The method may comprise receiving an authorization request message for a transaction conducted by a user with a merchant. The authorization request message may include a credential on file indicator. The method may further comprise determining that the authorization request message comprises the credential on file indicator. In some implementations, the authorization request message may be an ISO 8583 message.

The method may further comprise performing additional processing in response to the determination of the credential on file indicator in the authorization request message. In some embodiments, the additional processing may comprise at least one of performing an account update process using the credential on file indicator, performing a fraud analyses using the credential on file indicator, or performing token processing using the credential on file indicator.

In some embodiments, the method can further comprise sending the authorization request message including the credential on file indicator to an authorization computer. In some embodiments, the result of the fraud analyses performed by the server computer can be sent with the authorization request message to the authorization computer, which may utilize the result to determine whether to authorize the transaction. In some embodiments, the authorization computer may utilize the credential on file indicator to determine whether to authorize the transaction. For example, in some cases, the authorization computer may perform additional fraud analyses for the transaction using the credential on file indicator.

In some embodiments, the method can further comprise determining based on the credential on file indicator that the transaction is being conducted as part of a recurring relationship between the user and the resource provider. In some embodiments, the recurring relationship may enable transactions between the user and the resource provider to be conducted in varying intervals and have varying transaction amounts. In some embodiments, a resource provider computer associated with the resource provider may store credentials associated with the user. The user may not need to provide the credentials to the resource provider computer when conducting the transactions.

Embodiments of the invention are further directed to a server computer comprising a processor and a computer readable medium coupled to the processor. The computer readable medium can comprise code, executable by the processor, for implementing any of the methods described herein.

These and other embodiments of the invention are described in further detail below.

DETAILED DESCRIPTION

Some embodiments of the invention are related to identifying and analyzing credential on file transactions. Credential on file transactions may also be known as card on file transactions or account on file transactions. Credential on file transactions may be those initiated by a cardholder or merchant utilizing credentials (e.g., account information) that are already stored by the merchant's systems. Credential on file transactions may include transactions performed between the same cardholder and merchant and that can be of variable amount, and variable frequency. While credential on file transactions may be conducted by recognized and repeating users, they are difficult to track because there is no clear way of identifying such transactions. As a result, they may be considered high risk and ultimately declined by an issuer computer, which is an inefficient use of resources. This is increasingly an issue due to continued growth of digital commerce, which has led to an increase in electronic transactions in which a user's credentials are on file with the merchant.

Before proceeding with a further description of embodiments of the invention, some descriptions of some terms may be helpful.

A "credential on file" may refer to credentials associated with an account (e.g., username, password, account identifier, account number, etc.) that is on file with a merchant computer, digital wallet server, or other entity. In such situations, the credentials may be used by a merchant and a user to conduct purchases. In a credential on file transaction, the user does not need to specifically provide his or her credentials to a merchant when conducting a transaction, since the merchant computer associated with the merchant already stores them. Credential on file transactions may vary in frequency and/or amount and may represent a recurring relationship between a user (e.g., cardholder) and a merchant to purchase goods or services provided over a period of time or on demand. A credential on file may be alternatively referred to as a card on file or an account on file.

"Recurring transactions" may be multiple transactions processed at predetermined intervals. In some embodiments, the intervals may not exceed one year between each transaction. These recurring transactions may represent a relationship between a cardholder and a merchant to purchase goods or services provided over a period of time. A "US Region" transaction may be a transaction for which a cardholder provides permission, in either written or electronic format, to a merchant to periodically charge an account number for recurring goods or services. These may include payment of recurring charges, such as insurance premiums, subscriptions, internet service provider monthly fees.

An "authorization request message" may be an electronic message that is sent to a payment processing network and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a user name, an expiration date, etc. An authorization request message may also comprise "transaction information," such as any information associated with a current transaction, such as the transaction amount, merchant identifier, merchant location, acquirer bank identification number (BIN), card acceptor ID, etc., as well as any other information that may be utilized in determining whether to identify and/or authorize a transaction.

An "authorization response message" may be an electronic message reply to an authorization request message generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant's access device (e.g. POS equipment) that indicates approval of the transaction. The code may serve as proof of authorization. As noted above, in some embodiments, a payment processing network may generate or forward the authorization response message to the merchant.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

An "issuer" may typically refer to a business entity (e.g., a bank) that maintains an account for a user that is associated with a portable communication device such as an account enrolled in a mobile application installed on a portable communication device. The issuer may also be known as an authorization entity and may be associated with an authorization computer.

A "merchant" may typically be an entity that engages in transactions and can sell goods or services, or provide access to goods or services. The merchant may also be known as a resource provider, resource providing entity, or the like and may be associated with a resource provider computer.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. The acquirer may be known as a transport computer.

A "payment token" may include an identifier for a payment account that is a substitute for an account identifier, such as a primary account number (PAN). For example, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing payment processing networks (e.g., ISO 8583 financial transaction message format). In some embodiments, a token may be used in place of a PAN to initiate, authorize, settle or resolve a payment transaction or represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

Figure 1:
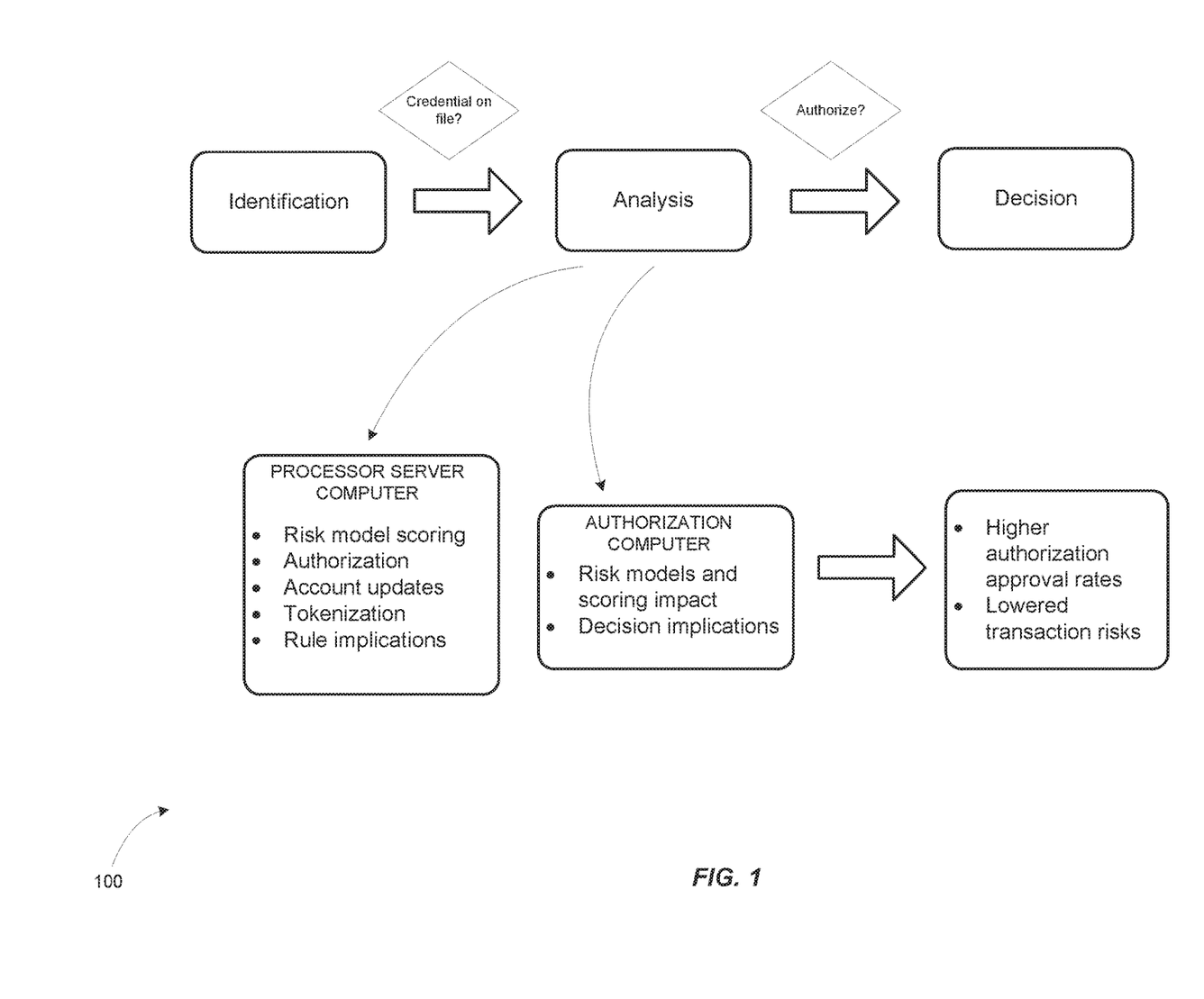
FIG. 1 shows a flow diagram according to embodiments of the present invention.

FIG. 1 shows a flow diagram 100 according to embodiments of the present invention. Flow diagram 100 includes a high level flow for the use and effects of detection of a credential on file transaction based on a credential on file indicator. Flow diagram 100 shows a method that includes performing identification, analysis, and decision steps for a transaction conducted between a user and a merchant.

For the identification step, a credential on file transaction may be identified based on detection of a credential on file indicator. In some embodiments, the credential on file indicator may be included in or sent with an authorization request message for the transaction. The credential on file indicator may be of any suitable format. For example, the credential on file indicator may be a flag or may be a data field comprising the indicator and additional subfields holding data related to the indicator.

For the analysis step, several entities may perform transaction processing based on identification of the credential on file transaction. In some embodiments, based on the detection of the credential on file indicator, a processor server computer and an authorization computer may perform risk scoring for the transaction. The use of the credential on file indicator may affect risk scoring outcomes and authorization decisions. Typically, the credential on file indicator may indicate that the transaction is at lower risk because the credential on file indicator indicates an existing contractual recurring relationship between the user and the merchant.

In some embodiments, the processor server computer may also perform other processes based on the detection of the credential on file indicator. For example, tokenization processes may be affected. The processor server computer may be more likely to issue a token based on the lower risk associated with the credential on file transaction. In addition, the processor server computer may also perform additional processes for updating account information for users, so that their accounts reflect an association with the credential on file indicator (e.g., and lower risk).

For the authorization step, an authorization decision is derived for the transaction. In some cases, information derived from the processing performed in the analysis step may be utilized to make the authorization decision. For example, the authorization decision may be made by taking into account the risk scores derived by the processor server computer and the authorization computer based on detection of a credential on file indicator. As described above, the risk scores may reflect lower risk because the credential on file indicator may indicate that the user has been previously authenticated by the merchant.

The use of the credential on file indicator has several beneficial effects. Conventional systems are not able to detect transactions in which a user and merchant have an existing recurring relationship unless the user and the merchant conduct transactions in regular intervals and of the same transaction amount (e.g., monthly subscription). The credential on file indicator enables systems to be able to detect repeated transactions between users and merchants, where the repeated transactions do not necessarily fit the traditional definition of recurring transactions. For example, a user may utilize an account created with a merchant to make multiple purchases from the merchant over time. While the merchant computer associated with the merchant may store credentials associated with the user, the purchases may be associated with various transaction amounts and may occur at irregular intervals. Thus, embodiments of the invention enable a group of transactions that were previously not able to be distinguished to be identifiable.

Identifying these transactions using the credential on file indicator affects the transaction processing system as a whole. Since transactions associated with the credential on file indicator indicate that a user has a relationship with a merchant, transaction processing entities can recognize the transactions as having lower risk. This can shorten the time and processing power utilized to process these transactions. For example, there is a reduced likelihood that these transactions are falsely categorized as being at risk, which forgoes the need to perform additional fraud analysis and reviews for these transactions. Resources typically utilized for such additional fraud analysis and reviews can be allocated for use elsewhere, such as for processing new transactions or speeding up processing of current transactions. Thus, embodiments of the invention enable higher authorization approval rates, which leads to more efficient processing of online transactions by the transaction processing system as a whole.

Figure 2:
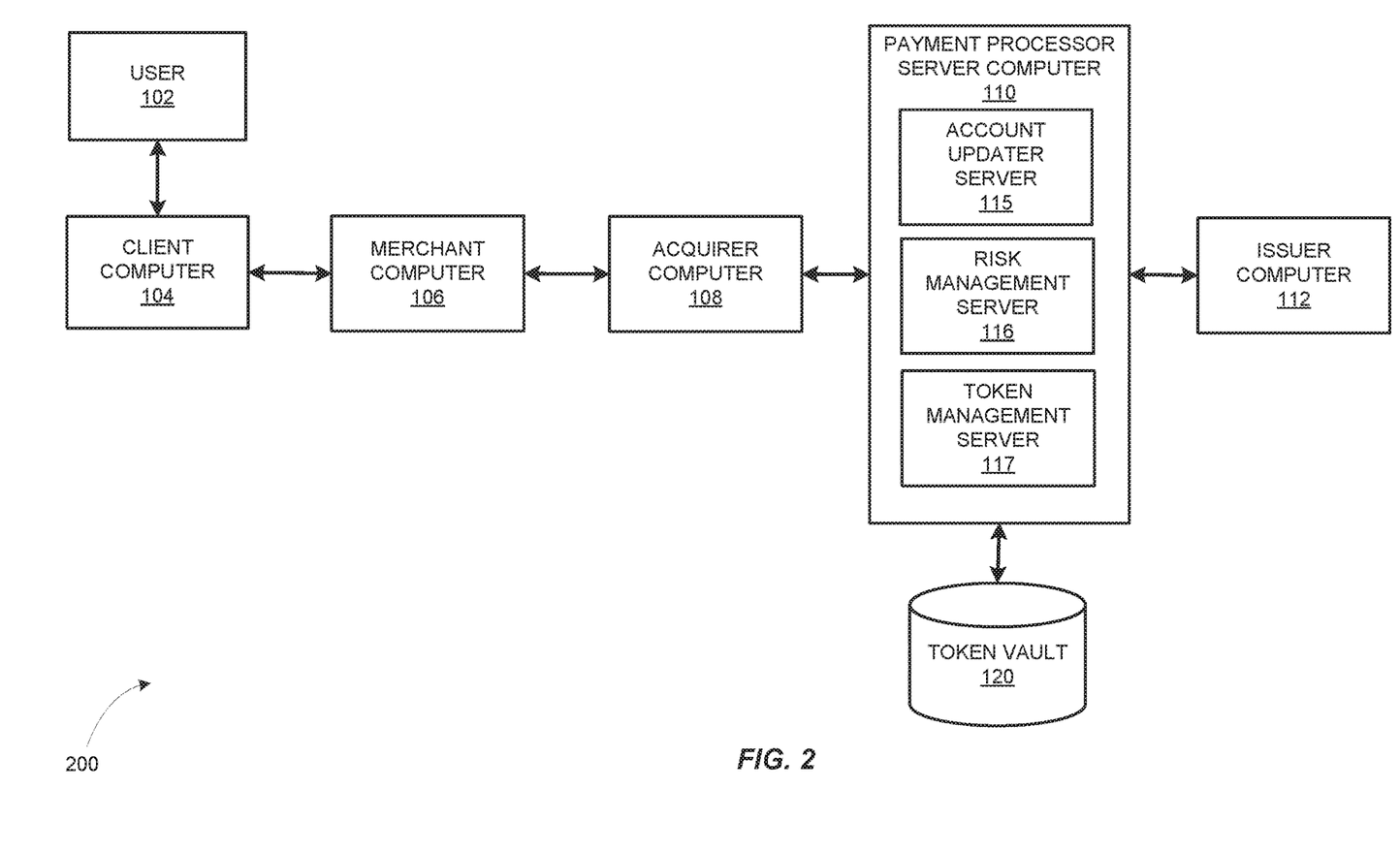
FIG. 2 shows a block diagram of a system according to embodiments of the present invention.

FIG. 2 illustrates an exemplary system 200 with at least some of the components for implementing embodiments of the invention. FIG. 2 includes a user 102 that operates a client computer 104 to communicate with a merchant computer 106. The merchant computer 106 may be communication with an acquirer computer 108, a payment processor server computer 110, and an issuer computer 112. The payment processor server computer 110 may be in communication with a token vault 120. Payment processor server computer 110 may comprise an account updater server 115, risk management server 116, and token management server 117. Servers 115, 116, 117 may alternatively be software modules within the payment processor server computer 110.

The entities included in FIG. 2 may be in communication by any suitable communications network. A suitable communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

A user 102 can initiate an electronic transaction with the merchant computer 106 using a client computer 104. User 102 may also be known as a consumer, customer, or cardholder. In some other instances, user 102 may conduct a transaction in person at a merchant location associated with merchant computer 106. User 102 may conduct credential on file transactions, which may also be known as card on file or account on file transactions.

Credential on file transactions can be of variable amounts and may be conducted at irregular intervals. These transactions may represent a recurring relationship between user (e.g., user 102) and a merchant (e.g., associated with merchant computer 106) for the user to purchase goods or services from the merchant over a period of time or on demand. Typically, the relationship may be established by request of the user at the time of a transaction. However, credential on file transactions may not fall under the current rules that are used to track recurring transactions, which are transactions that occur at regular time intervals (e.g., by a monthly subscription) and associated with similar transaction amounts.

In some embodiments, user 102 may provide consent to another entity (e.g., merchant) to store their credentials to establish a recurring relationship. In some cases, user 102 may be presented with information related to the recurring relationship with a request to confirm that the recurring relationship is to be established. The information may include a truncated version of their credentials to be stored (e.g., last four digits of PAN), a method of notification regarding changes to the consent agreement, an expiration date of the recurring relationship, and how the stored credentials will be utilized.

In some embodiments, user 102 may further provide consent to the entity (e.g., merchant) storing their credentials to initiate transactions utilizing their stored credentials. In addition to the information described, user 102 may be presented with information related to cancellation and refund policies, merchant location, transaction amount, method of calculation of transaction amount, surcharges, frequency or events that will prompt a transaction, and total purchase price as well as terms of future installation payments.

The client computer 104 may be any suitable device for communicating with the merchant computer 106 or the payment processor server computer 110. Some non-limiting examples of client computer 104 may include point-of-sale (POS) devices, cellular phones (e.g., mPOS), PDAs, personal computers (PCs), tablet PCs, wearable devices, automobiles with remote communication capabilities, etc.

The merchant computer 106 may be operated by a merchant that may sell goods and/or services via a website, and that may accept payments over the Internet. Merchant computer 106 may have an established relationship with user 102. Merchant computer 106 may store credentials received previously from user 102, so that user 102 does not need to provide their credentials each time they conduct a transaction with the merchant. In some cases, merchant computer 106 may validate the cardholder's identity via additional procedures (e.g., login information, biometric data, etc.) before processing credential on file transactions.

The merchant computer 106 may indicate whether certain transactions are credential on file transactions. For example, once the relationship between user 102 and the merchant is established, merchant computer 106 may include a credential on file indicator in an authorization request message (e.g., "0100" authorization request message) indicating whether the transaction is a credential on file transaction. The indicator may be carried in a field such that it does not conflict with existing field usages. This can result in minimal impact to existing infrastructure and usages, as well as minimizing implementation costs. In some embodiments, the indicator may be supplemented to an existing indicator (e.g., current "recurring transaction" indicator).

In some embodiments, other data related to the credential on file transaction may also be included, such as length of the relationship between user 102 and the merchant, user authentication method, confirmation of password or identification validation, and confirmation of device validation. Since the indicator and other data is included in the authorization request message that is sent to issuer computer 112, this allows for identification of transactions as credential on file transactions and enables differentiated treatment of the transactions by issuer computer 112. In some cases, merchant computer 106 may retain information related to consent by user 102 to establish the recurring relationship, and provide the information to issuer computer 112 upon request.

In some embodiments, merchant computer 106 may provide user 102 with information related to an established recurring relationship. For example, merchant computer 106 may notify user 102 in the event of a change to circumstances surrounding the recurring relationship. In some cases, merchant computer 106 may provide information related to the record of consent by user 102 to establish the recurring relationship or information related to a cancellation procedure for cancelling the recurring relationship. In some cases, merchant computer 106 may generate and provide receipts for credential on file transactions. For example, if user 102 cancels installment payments utilizing a cancellation procedure, merchant computer 106 may provide confirmation of the cancellation and any refunds for a specific transaction amount in a printed receipt.

Merchant computer 106 may not complete a credential on file transaction for various reasons. For example, merchant computer 106 may not complete a credential on file transaction beyond the duration originally set for with the recurring relationship. In addition, if user 102 requests to change payment methods or cancels the recurring relationship according to a cancellation process, merchant computer 106 may not complete a credential on file transaction. Further, merchant computer 106 may not complete a credential on file transaction if it receive a declines response when conducting the transaction.

The acquirer computer 108 is typically a system for an entity (e.g., a bank) that has a business relationship with a particular merchant or other entity. The acquirer computer 108 may route the authorization request for a transaction to the issuer computer 112 via payment processor server computer 110.

Payment processor server computer 110 may include data processing subsystems, networks, and operations used to support and deliver authorization services, and clearing and settlement services. In some cases, payment processor server computer 110 may be operated by one or more server computers. An example of payment processor server computer 110 includes VisaNet®, operated by Visa®. Payment processor server computer 110 may include wired or wireless network, including the internet. In some embodiments, payment processor server computer 110 may be in communication with token vault 120 that may store an association between a token and an associated account number. Payment processor server computer 110 may include account updater server 115, risk management server 116, and token management server 117.

Account updater server 115 may enable a service that performs an automated account update function in real-time in response to receiving a credential on file indicator. For example, after payment processor server computer 110 receives the authorization request message including the credential on file indicator, account updater server 115 may store information about the transaction (e.g., that it is credential-on-file) and communicate the stored information to other entities, such as risk management server 116 and token management server 117. This information can be utilized to process future transaction by user 102 and can lead to increased approval rates of transactions. Further details on account updater functionality can be found in U.S. Published Patent Application No. 20130030972, which is herein incorporated by reference in its entirety for all purposes.

Risk management server 116 may enable a risk analysis based on receiving the credential on file indicator and related information. Since risk management server 116 has knowledge about whether the transaction is credential on file, the credential on file transactions will be less likely to be deemed high risk. In some cases, risk management server 116 may communicate risk analysis results to other entities, such as token management server 117 and issuer computer 112. Risk management server 116 may be capable of identifying transactions with a higher risk of fraud and perform further cardholder authentication for such transactions. Risk management server 116 may conduct a review of transactions over a certain period of time and enable differentiated treatment of transactions based on one or more of risk indicators, user profiles, and merchant models. Further details on risk systems may be found in U.S. Pat. No. 6,119,103 and U.S. Published Patent Application No. 20140188697, which are herein incorporated by reference in their entirety for all purposes.

Token management server 117 may enable token issuance or processing based on receiving the credential on file indicator and related information. For example, the fact that a transaction is identified as a credential on file transaction may make it more likely that the transaction is approved for token issuance. Aspects of token management processes and systems can be found in U.S. Published Patent Application No. 201500456338, which is herein incorporated by reference in its entirety for all purposes.

Token vault 120 may comprise any information related to tokens. For example, token vault 120 may store tokens associated with the user 102 and a mapping of the tokens to their associated payment accounts or devices. Token vault 120 may comprise any sensitive information (e.g., account number) associated with the tokens. In some embodiments, payment processor server computer 110 may communicate with token vault 120 to de-tokenize a token. Token vault 120 may de-tokenize the token by determining information associated with the token based on the stored mapping. In some implementations, token vault 120 may reside at payment processor server computer 110.

The issuer computer 112 (also may be known as an authorization computer) is typically a computer run by a business entity (e.g., a bank) that may have issued the payment (credit/debit) card, account numbers or payment tokens used for the transactions. Some systems can perform both issuer computer 112 and acquirer computer 108 functions. When a transaction involves a payment account associated with the issuer computer 112, the issuer computer 112 may verify the account and respond with an authorization response message to the acquirer computer 108 that may be forwarded to other entities, such as merchant computer 106, an access device corresponding to merchant computer 106, or client computer 104, if applicable.

At a later time (e.g., at the end of the day), a clearing and settlement process can occur between the acquirer computer 108, the payment processor server computer 110, and the issuer computer 112.

A method according to the embodiments of the invention can be described with respect to components of FIG. 2. Certain steps of the method performed by a server computer, such as payment processor server computer 110, shown in flow diagram 300 of FIG. 3 (e.g., as S301, S302, etc.) are also referenced in the description below.

User 102 may utilize client computer 104 to conduct a transaction with merchant computer 106. At the time of transaction, user 102 may request to set up a credential on file (card on file). User 102 may enroll their account information and establish a relationship with merchant computer 106, such that user 102 may conduct repeated transactions with merchant computer 106. These repeated transactions do not necessarily occur at regular intervals and do not necessarily have to be of similar value. Additionally, they may span across different types of merchants, transaction channels, and platforms. During the initial set up of the credential on file, merchant computer 106 may conduct additional authentication of user 102 as desired (e.g., CVV2 (card verification value) check, AVS (address verification service) check, etc.).

Subsequently, user 102 may continue the transaction with merchant computer 106. Since user 102 set up a credential on file, merchant computer 106 may develop a credential on file indicator to indicate that user 102 has established a relationship with merchant computer 106. The credential on file indicator may be of any suitable form such that it can be included in an authorization request message. For example, the credential on file indicator may be a flag or may be a data field comprising the indicator and additional subfields holding data related to the indicator. Exemplary credential on file indicators are described in more detail below.

User 102 may provide credentials (e.g., account information) to merchant computer 106 to conduct the transaction. In some cases, the transaction may be conducted by accessing a merchant website associated with merchant computer 106 using client computer 104. Merchant computer 106 may generate an authorization request message including the credential on file indicator to indicate that the transaction is a credential on file transaction. Merchant computer 106 may send the authorization request message to acquirer computer 108, which may forward the authorization request message to payment processor server computer 110. In some embodiments, the authorization request message may include additional information related to the credential on file indicator, such the length of the cardholder relationship between user 102 and merchant computer 106. In some implementations, the additional information may be taken into account for risk analysis (e.g., a longer relationship indicates less risk).

Figure 3:
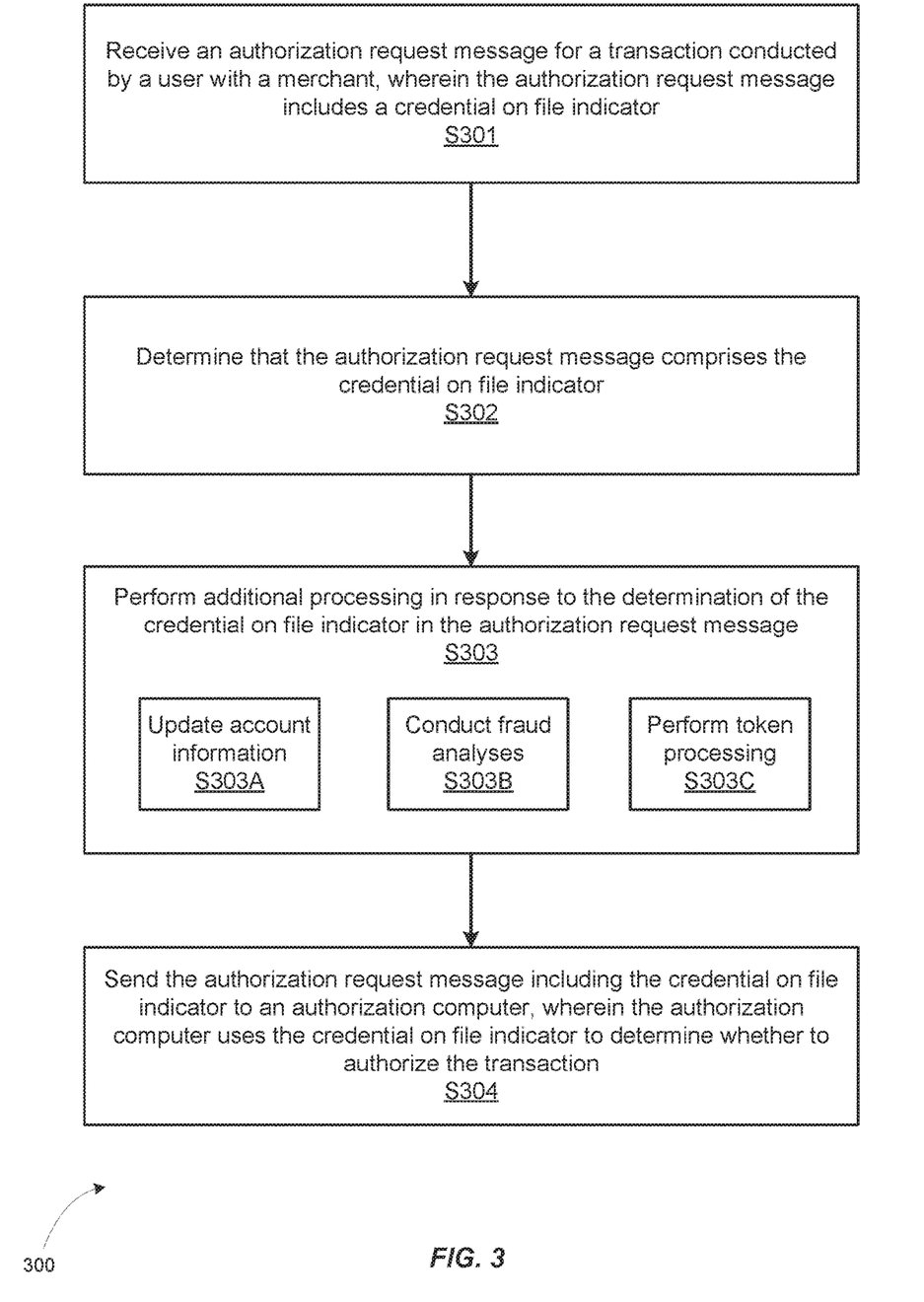
FIG. 3 shows an exemplary flow diagram for a method of using a credential on file indicator according to embodiments of the present invention.

Payment processor server computer 110 may receive the authorization request message (step S301) and determine that the transaction is a credential on file transaction based on the included credential on file indicator (step S302). In some embodiments, the credential on file indicator may be a predesignated code (e.g., "10") that indicates that the transaction is a credential on file transaction. In some implementations, the credential on file indicator may be stored in an existing field of the authorization request message. Upon receiving the authorization request message, payment processor server computer 110 may check whether the existing field includes the credential on file indicator. If the credential on file indicator exists, payment processor server computer 110 may proceed to perform addition processing in response to the determination of the credential on file indicator in the authorization request message (step S303).

In some embodiments, payment processor server computer 110 may update account information in response to the determination of the credential on file indicator in the authorization request message (step S303A). For example, account updater server 115 may store information related to the transaction conducted by user 102, including identification that the transaction is a credential on file transaction. The information stored by account updater server 115 may be utilized for processing of future transactions that may be conducted by user 102. Account updater server 115 may store information in any suitable format, so that it can access and update information related to each account for which it stores information. Account updater server 115 may also communicate with risk management server 116 and token management server 117 regarding updated information, such as providing a notification that the transaction is a credential on file transaction.

In some embodiments, payment processor server computer 110 may conduct fraud analyses in response to the determination of the credential on file indicator in the authorization request message (step S303B). For example, risk management server 116 may conduct a risk analysis based on the known fact that the authorization request message included the credential on file indicator. Risk management server 116 may utilize the knowledge that the transaction is a credential on file transaction in various ways. In some implementations, risk management server 116 may utilize the knowledge that the transaction is a credential on file transaction as one input into a risk model. In other implementations, risk management server 116 may weight a risk score based on the knowledge that the transaction is a credential on file transaction. In other implementations, risk management server 116 may categorize the transaction as having a certain risk level based on knowledge that the transaction is a credential on file transaction.

In general, the inclusion of the credential on file indicator in the authorization request message can indicate that the transaction is not at high risk. This is because the credential on file indicator indicates that user 102 has been previously authenticated by the merchant computer 106 and is likely to be conducting an authentic transaction. Thus, while risk management server 116 may utilize the knowledge that the transaction is a credential on file transaction in various ways as described above, it is understood that in each case, the result of the fraud analyses may reflect a lower likelihood of fraud compared to that of fraud analyses for typical transactions.

Risk management server 116 may communicate the results of the fraud analyses to other entities. In some cases, risk management server 116 may include information in the authorization request message indicating the results of the fraud analyses so that another entity, such as issuer computer 112, that receives the authorization request message can utilize the information. In some embodiments, risk management server 116 may also communicate the results of the fraud analyses to token management server 117.

In some embodiments, payment processor server computer 110 may perform token processing in response to the determination of the credential on file indicator in the authorization request message (step S303C). For example, token management server 117 may determine whether to issue a token from token vault 120 based on the known fact that the authorization request message included the credential on file indicator. Token management server 117 may receive an indication that the transaction is a credential on file transaction from account updater server 115 or risk management server 116. In some cases, token management server 117 may also receive information indicating the result of fraud analyses from risk management server 116.

Token management server 117 may utilize the information received from account updater server 115 and risk management server 116 to determine whether to issue a token. In some cases, token management server 117 may determine that the transaction is associated with a certain level of risk based on the information indicating the result of fraud analyses received from risk management server 116. If the determined level of risk is below a predetermined threshold, token management server 117 may choose to issue a token. In other cases, token management server 117 may simply utilize the knowledge that the credential on file indicator was included in the authorization request message to determine whether to issue a token. For example, token management server 117 may be operate based on a plurality of rules, one of which may allow it to issue a token if the transaction is determined to be a credential on file transaction.

Payment processor server computer 110 may send the authorization request message including the credential on file indicator to issuer computer 112, which may utilize the credential on file indicator to determine whether to authorize the transaction (step S304). Issuer computer 112 may also be known as an authorization computer. Upon receiving the authorization request message, issuer computer 112 may check whether the existing field that may be predesignated to store the credential on file indicator includes the credential on file indicator. If the credential on file indicator exists, issuer computer 112 may determine that the transaction is a credential on file transaction.

Issuer computer 112 may make an authorization decision based on the received authorization request message. Issuer computer 112 may be able to differentiate this transaction from other less trusted transactions based on the inclusion of the credential on file indicator in the authorization request message. This is because the credential on file indicator can indicate that user 102 previously conducted an authentication process with merchant computer 106 and has established a recurring relationship with merchant computer 106. Hence, issuer computer 112 can recognize that the transaction is not high risk, even though transactions conducted by user 102 do not necessarily fit typical guidelines of recurring transactions that are conducted at regular intervals. Issuer computer 112 may perform additional fraud analyses using the credential on file indicator before making the authorization decision. In some embodiments, issuer computer 112 may also take into account the result of fraud analyses performed by payment processor server computer 110 when making the authorization decision.

Issuer computer 112 may generate an authorization response message and include an indication of the authorization decision in the authorization response message. Issuer computer 112 may send the authorization response message to payment processor server computer 110, which may send the authorization response message to merchant computer 106 via acquirer computer 108.

Embodiments of the invention provide several advantages. For example, issuer computers may be able to identify credential on file transactions indicating merchant and cardholder relationships and utilize this information in their authorization decision processes, whereas current systems and methods do not enable such transaction types to be identified. This can forgo these transactions from being unnecessarily processed as high risk transactions. Processing high risk transactions can result in increased use of computing resources due to additional fraud analyses (e.g., transmission of transaction data to other review computers, additional evaluation using different risk models, calculation of additional risk scores, etc.) that may be required before an authorization decision can be made for the transactions. Thus, embodiments of the invention can reduce processing power and time utilized compared to that of conventional transaction systems.

Embodiments of the invention also enable higher approval rates. While conventional systems cannot recognize credential on file transactions and therefore process them as typical transactions, embodiments of the invention can identify credential on file transactions and distinguish them as being associated with lower risk. Processing the credential on file transactions as lower risk decreases processing time and computing resources that have to be utilized by merchant computers, acquirer computers, issuer computers, and payment processing server computers to process these transactions. Embodiments of the invention may be utilized across channels including card present and card not present transactions across various products (e.g., merchandise, digital, service, etc.) and may be applied to the emergence of wallets and payment facilitators.

Accordingly, there are various advantages resulting for each entity. Cardholders may experience improved cardholder experience due to reduced friction and minimal disruption of service. The number of falsely identified high risk transactions may be decreased, which forgoes the need for alert notifications to client computers utilized by cardholders. Further, enhanced cardholder experience may lead to overall increased satisfaction with the card and the issuer. Merchant computers may experience higher approval rates with further lowered transaction risk and thus may receive benefit of differentiated treatment for credential on file transactions. This may result in reduced acceptance costs with a reduced number of declines and chargebacks, which may enable computing resources that would have normally been utilized towards processing declines and chargebacks to be utilized elsewhere (e.g., for processing new transactions). Hence, merchant computers may minimize opportunities of losing customers because of improved customer experience leading to improved merchant's service perception (e.g., less friction). Acquirer computers may experience reduced acceptance costs and improved merchant servicing.

Issuer computers may experience reduce risk of change of payment card and maintain top-of-wallet status.

Figure 4:
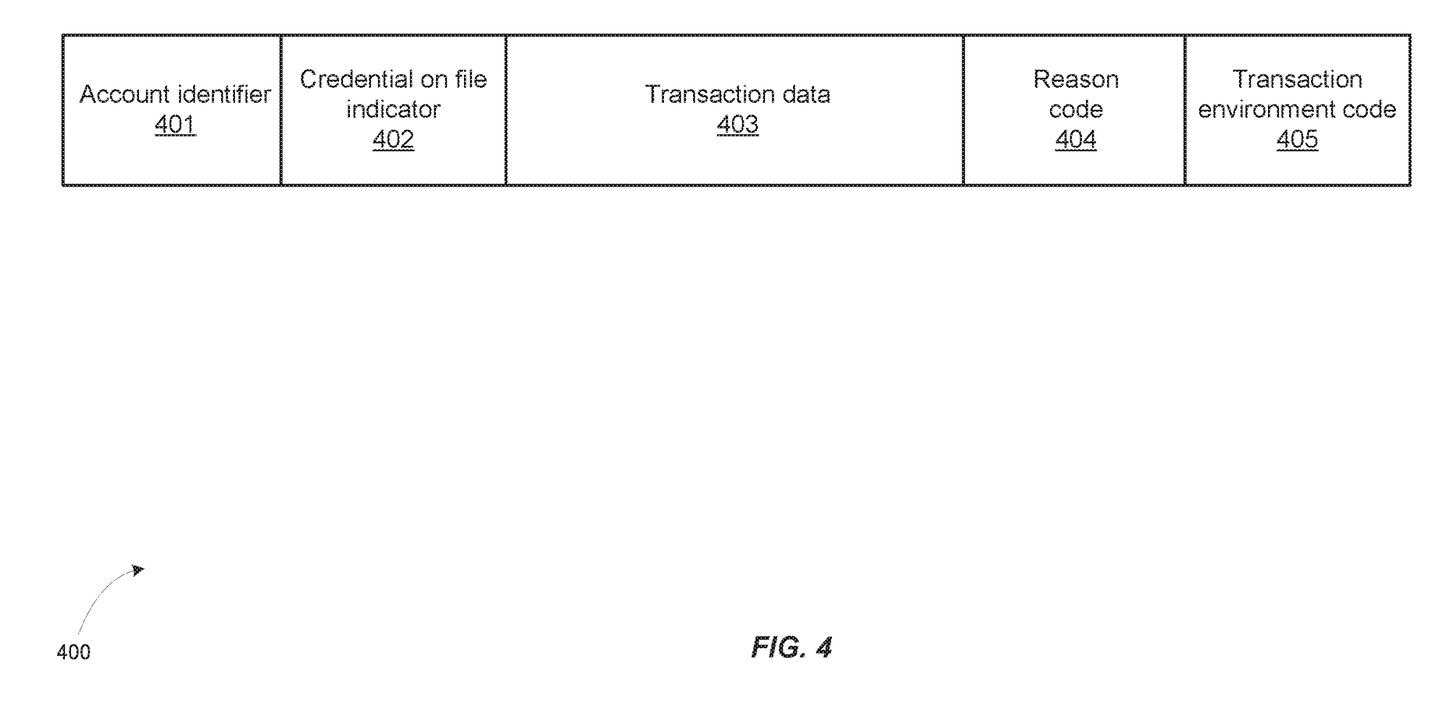
FIG. 4 shows an exemplary authorization request message including a credential on file indicator according to embodiments of the present invention.

FIG. 4 shows an exemplary authorization request message 400 including a credential on file indicator according to embodiments of the present invention. Authorization request message 400 includes an account identifier 401, a credential on file indicator 402, transaction data 403, a reason code 404 and a transaction environment code 405. It is understood that authorization request message 400 may comprise additional fields not shown in FIG. 4. Further, in some embodiments, some fields shown in FIG. 4 may not be utilized (e.g., null values). The ordering of data stored in authorization request message 400 may be altered as appropriate. In some embodiments, authorization request message 400 may be an ISO 8583 message (e.g., "0100" authorization message).

Account identifier 401 may be an identifier associated with the account of the user. The user may utilize the account to pay for the transaction. In some embodiments, account identifier 401 may be a PAN (primary account number) associated with the account. In other embodiments, account identifier 401 may be a payment token associated with the account, where the payment token may correspond to the PAN.

Credential on file indicator 402 may be data that indicates whether a transaction is a credential on file transaction. A credential on file transaction may be a transaction conducted between a user and a merchant, where the user utilizes credentials that are already known by the merchant computer to conduct the transaction. The credential on file transaction may be one of multiple transactions conducted by the user with the merchant, where the transactions do not necessarily occur in regular intervals. In some embodiments, credential on file indicator 402 may be a flag or may be stored in a data field, which may comprise additional subfields holding data related to the credential on file indicator. In some implementations, credential on file indicator 402 may be carried in a data field (e.g., "POS Entry Mode" field) so that it does not conflict with existing field usages of current authorization request messages. Credential on file indicator 402 may be of any suitable format, such as a numerical, alphanumerical, or Boolean value.

Transaction data 403 may be any information related to a transaction. Transaction data 403 may include information that may be utilized by transaction entities to process the transaction. In some embodiments, transaction data 403 may include a transaction identifier, transaction type indicators (e.g., mail order telephone order (MOTO) indicator, electronic commerce indicator (ECI), etc.), and other background information (e.g., timestamp, merchant location, etc.).

Reason code 404 may be data that indicates a purpose for transmitting the authorization request message. Reason code 404 may be any suitable numeric or alphanumeric characters. Reason code 404 may be one of multiple reason codes, which may each map to a different purpose description. Exemplary purposes to which reasons code may map include a re-authorization, incremental authorization, account top-up, no show, delayed charges, and resubmission.

Transaction environment code 405 may indicate further information regarding the characteristics of a transaction. In some cases, transaction environment code 405 may identify transactions where credentials are placed on file for the first time. Transaction environment code 405 may be of any suitable format, such as a combination of numeric or alphanumeric characters. In an exemplary case, transaction environment code 405 may indicate a "C" to indicate that a credential has been placed on file for the first time. In some embodiments, transaction environment code 405 may be stored in an existing field (e.g., "POS Environment" field) in an authorization message. In this case, the existing field may store other values, such as a "R" to indicate recurring transactions and an "I" to indicate installment transactions.

While FIG. 4 shows an exemplary authorization request message, it is understood that an authorization response message may comprise similar fields. However, an authorization response message may further include data that indicates an authorization decision for a transaction. In some embodiments, the data may be stored in a response code field.

The table below shows information related to relevant fields that may be included in authorization messages according to embodiments of the invention. The fields may be those utilized with existing authorization message systems and formats. The changes indicated in the table may be compatible with such existing authorization message systems and formats to enable minimal impact to existing infrastructure and usages, as well as minimizing implementation costs. It is understood that the information shown in the table is not restrictive and that the field names, field numbers, field descriptions, and changes may be altered as appropriate in certain cases.

| Field Name | Field # | Field Description | Changes |
|---|---|---|---|
| Primary Account Number | 2 | Number identifying cardholder account or relationship | — |
| POS Entry Mode Code | 22 | Method used to enter account number and expiration date | Support new value to identify credential on file transactions |
| POS Condition Code | 25 | Identifies transaction conditions at the point of sale | No requirement for value to identify recurring transaction for transactions comprising token data |
| Track 2 Data | 35 | Track 2 Data from the magenetic stripe of a card | — |
| Response Code | 39 | Indicates the response to an authorization request | — |
| Additional Amounts | 54 | Account balance information for POS or ATM balance inquiries or ARM cash disbursements | Support new amount type indicating total cumulative authorized amount for incremental authorization transactions |

-continued

| Field Name | Field # | Field Description | Changes |
|---|---|---|---|
| Integrated Circuit Card-Relate Data | 55 | Integrated chip-related data that is transmitted from the chip to the issuer and from the issuer to the chip | — |
| MOTO/ECI Indicator | 60.8 | Type of mail/telephone order or level of security used in an e-commerce transaction | — |
| Partial Authorization Indicator | 60.10 | Code indicating whether an acquirer supports partial authorization transactions | Identifies both partial authorization and new estimated amount indicator |
| Transaction ID | 62.2 | Links original transaction to subsequent related transactions | Retained in all subsequent merchant initiated transactions based on original user initiated transaction |
| Supporting Information | 125 | Reserved for supporting information | Include support to carry transaction identifier of original authorization in a series of merchant intiated transactions |
| Message Reason Code | 63.3 | Code indicating reason for an online acquirer advice, reversal, or partial reversal | Support new values to identify merchant initiated transactions |
| POS Environment | 126.13 | Indicator for Recurring and Installment payments | Support new value to identify transactions where credentials are placed on file for the first time |

A new value in an authorization request message may indicate a credential on file transaction. Any suitable value may be used. In an exemplary case, the new value may be "10" entered in positions 1-2 of Field 22 as described in the table above. Acquirer computers may submit authorization and purchase request messages with the new value of 10 in Field 22, positions 1-2 when the merchant is initiating a transaction on behalf of the cardholder using credentials stored on file. The new credential on file indicator value may be supported in the existing Field 22, positions 1-2 for various ISO 8583 messages, such as "0100" Authorization, "0120" Advice, "0200" Full financial, "0220" Advice, "0220" Adjustments, and "9240" and "9242" Collection only messages.

Exemplary authorization request message formats utilized for establishing a credential on file relationship between a user and a merchant and a subsequent credential on file transaction is included below. The field names may correspond to those indicated in the table above. In an exemplary case, the credential on file transaction may be a user initiated transaction for which the user utilizes stored payment credentials to make a purchase from a merchant. The merchant computer associated with the merchant may send an authorization request message including a credential on file indicator based on the user's established relationship with the merchant.

Stored Credential:

various information for authentication processes as well as be transmitted for different purposes. The table below shows exemplary information that may be included in authorization request messages that may be utilized for user initiated transactions.

User Initiated Transactions:

| POS Entry Mode | Authentication | Purpose |
|---|---|---|
| Swipe, NFC, Contact Chip, Key-Entered | Signature, cardholder verification service info, PIN, address verification service (AVS) info, card verification value (CVV), Cryptogram, CVV2, token authentication verification value (TAVV) | Purchase, Account Verification, Installment, Recurring, Establishment of credential on file |
| Stored credential | Cardholder verification service info, Password, Fingerprint, CVV2, TAVV, AVS | Purchase, Account Verification |

Exemplary information that may be included in authorization request messages utilized for user initiated transactions is described. In some cases, the credential on file indicator may be stored in the "POS entry mode" field of an authorization request message. Typically, the "POS Entry Mode" field may store values indicating the payment

| Fields | Cardholder PAN | POS Entry Mode | POS Condition Code | MOTO/ECI Indicator | Transaction identifier | Message reason code | POS Environment |
|---|---|---|---|---|---|---|---|
| Establish of relationship | PAN or token | Key entry (01) | ECI(59) | any | — | — | C |
| User initiated transaction | PAN or token | Credential on file (10) | ECI(59) | Non-authenticated (07) | — | — | — |

While authorization request messages for user initiated transaction and those for merchant initiated transactions may both comprise credential on file indicators, they may utilize method by which the user initiated transaction associated with the authorization request message was conducted. Exemplary payment methods include those that utilize magnetic-stripe (e.g., swipe) technologies, near-field communications (NFC) technologies, contact chip technologies, or key-entering actions into a POS terminal device. The credential on file indicator may be stored in the "POS Entry Mode" field instead of or in addition to these values.

Certain information can be utilized for authentication processes performed for user initiated credential on file transactions. The authentication processes may include those for authenticating the user that initiated the transaction, as well as authenticating the account utilized for a transaction. In some cases, the information to be utilized for authentication processes for credential on file transactions may include information related to an authentication service and address verification system, a password, a fingerprint, a card verification value, and a token authentication verification value.

There may be various purposes for transmitting an authorization request message for a user initiated credential on file transaction. The purpose for transmitting an authorization request message may be indicated in the authorization request message as a reason code that maps to a certain purpose description. One purpose for transmitting the authorization request message may be for a purchase by the user. For example, a user may have an account associated with a merchant application through which they may make in-app purchases. The purchases may be conducted irregularly and may have different transaction amounts. Another purpose for transmitting the authorization request message may be for account verification. For example, a user's account may have to be verified by a merchant or other entity (e.g., processor server computer) before the user can proceed with a certain action (e.g., update account settings). The inclusion of the credential on file indicator in these authorization request messages can indicate that the users have been previously authenticated by the merchant and that the transactions are associated with a lower likelihood of risk.

The table below shows exemplary information that may be included in authorization request messages that may be utilized for merchant initiated transactions.

Similar to the authorization request messages utilized for user initiated transactions, an authorization request message for a merchant initiated transaction may include the credential on file indicator in the "POS entry mode" field. In some embodiments, there may not be information utilized for authentication processes included in an authorization request message for a merchant initiated credential on file transaction. However, the authorization request message may include a transaction identifier. The transaction identifier may be preserved from a previous or original transaction and may be used to link a merchant initiated transaction to a previous or original transaction (e.g., user initiated transaction). In some cases, the transaction identifier may include a digital signature of the previous or original transaction.

There may be various purposes for transmitting an authorization request message for a merchant initiated credential on file transaction. The purposes may be indicated in the authorization request message as a reason code, which may be mapped to a certain purpose description. In some cases, the transmission of the authorization request message may be triggered by incremental authorizations, resubmissions, delayed charges, reauthorization processes, and no shows. In other cases, the transmission of the authorization request message may be triggered by instructions provided by a previous user initiated transaction. Exemplary types of transactions include account top-up, installment, recurring, and credential-on-file transactions.

Further descriptions of the various types transactions listed above are included below. Exemplary authorization request message formats that may be utilized for each type of transaction are also shown.

Reauthorization Transaction:

| Fields | Cardholder PAN | POS Entry Mode | POS Condition Code | Track/Chip data | Transaction identifier | Message reason code |
|---|---|---|---|---|---|---|
| Establish of relationship | PAN or token | Key entry (01) or credential on file (10) | ECI (59) | — | — | — |
| Merchant initiated transaction | PAN or token | Credential on file (10) | ECI (59) | — | Retain from original | Reauth (3903) |

Merchant Initiated Transactions:

| POS Entry Mode | Authentication | Purpose |
|---|---|---|
| Key-Entered, Stored credential | None (Note: Transaction ID can be utilized to link related transactions) | Incremental, Resubmission, Delayed charges, Reauthorization, No show Account top-up, Installment, Recurring, Unscheduled Credential on File |

A reauthorization may be a purchase made after an original transaction and can reflect a number of specific conditions. For example, a split shipment is a common type of reauthorization. A split shipment can occur when purchased goods are not available for shipment at the time of the user's purchase. A separate authorization process may be conducted to ensure that the user has enough available funds when the goods become available to ship. A reauthorization may also be used when an estimated authorization amount is presented and the merchant wants to authorize the final amount.

Delayed Charges Transaction:

| Fields | Cardholder PAN | POS Entry Mode | POS Condition Code | Track/Chip data | Transaction identifier | Message reason code |
|---|---|---|---|---|---|---|
| Original Purchase | PAN or token | any | F2F (00) | (P) | — | — |
| Original Purchase (clearing) | PAN or token | same | — | (P) | Retain from original | — |
| Merchant Initiated Transaction | PAN or token | Key entry (01) or credential on file (10) | F2F (00) | — | Retain from original | Delayed (3902) |

A delayed charge may be an account charge associated with a recurring relationship between a cardholder and a merchant for services rendered. Exemplary merchants that may perform delayed charge transactions include hotels and car rentals.

Incremental Authorization Transaction:

| Fields | Cardholder PAN | POS Entry Mode | Additional Amounts | Additional Authorization Indicator | Transaction identifier | Message reason code |
|---|---|---|---|---|---|---|
| Original Transaction | PAN or token | any | — | Estimated (2, 3) | — | — |
| Merchant Initiated Transaction (Incremental 1) | PAN or token | Key entry (01) or credential on file (10) | Total authorized amount | — | Retain from original | Incremental (3900) |
| Merchant Initiated Transaction (Incremental 2) | PAN or token | Key entry (01) or credential on file (10) | Total authorized amount | — | Retain from original | Incremental (3900) |

An incremental authorization transaction may be a continuation of a user's original purchase where the originally approved amount can be modified to reflect the recurring relationship of the user and merchant. An incremental authorization may be typically found in hotel and rental environments, where the user has agreed to pay for any service incurred during the duration of the contract (e.g., a hotel stay or car rental).

No Show Transaction:

| Fields | Cardholder PAN | POS Entry Mode | POS Condition Code | Track/Chip data | Transaction identifier | Message reason code |
|---|---|---|---|---|---|---|
| Establish of relationship | PAN or token | Key entry (01) or credential on file (10) | MOTO (08) or ECI (59) | — | — | — |
| Merchant initiated transaction | PAN or token | Key entry (01) or credential on file (10) | MOTO (08) or ECI (59) | — | Retain from original | No show (3904) |

A no show transaction may be a transaction in which the merchant may be enabled to charge for services that the user entered into an agreement to purchase, but did not meet the terms. The merchant may charge a transaction amount (e.g., single night stay for a hotel).

Recurring Transaction:

| Fields | Cardholder PAN | POS Entry Mode | POS Condition Code | MOTO/ECI Indicator | Transaction identifier | Message reason code | POS Environment |
|---|---|---|---|---|---|---|---|
| User agreement established (initial) | PAN or token | any | any | MOTO or ECI (01/05/06/07) | — | — | R |
| Merchant initiated transaction (recurring period 1) | PAN or token | Credential on file (10) | MOTO (08) or ECI (59) | MOTO (01) or non-authenticated (07) | Retain from initial | — | R |
| Merchant initiated transaction (recurring period 2) | PAN or token | Credential on file (10) | MOTO (08) or ECI (59) | MOTO (01) or non-authenticated (07) | Return from recurring period 1 | — | R |

A recurring transaction may be the result of instructions governed by a relationship between the user and the merchant to charge a specific or variable amount, based on a defined interval. The user may consent to terms of the contract and established services, after which the first installment may be charged. The merchant may then charge recurring transactions on a regular basis.

Account Top Up Transaction:

| Fields | Cardholder PAN | POS Entry Mode | POS Condition Code | MOTO/ECI Indicator | Transaction identifier | Message reason code | POS Environment |
|---|---|---|---|---|---|---|---|
| Establish of relationship | PAN or token | Key entry (01) | ECI(59) | any | — | — | C |
| Merchant initiated transaction | PAN or token | Credential on file (10) | ECI(59) | Non-authenticated (07) | Retain from original | Top up (3905) | C |

An account top up transaction may be utilized to recharge a balance based on instructions. The balance may be a specific or variable amount, based on a variable interval. Account top up transaction may be utilized for telecommunications or transmit.

Unscheduled Credential on File Transactions:

| Fields | Cardholder PAN | POS Entry Mode | POS Condition Code | MOTO/ECI Indicator | Transaction identifier | Message reason code | POS Environment |
|---|---|---|---|---|---|---|---|
| Establish of relationship | PAN or token | Key entry (01) | ECI(59) | any | — | — | C |
| Merchant initiated transaction | PAN or token | Credential on file (10) | ECI(59) | Non-authenticated (07) | Retain from original | — | C |

Unscheduled credential on file transaction may utilize a stored credential for a fixed or variable amount that does not occur on a scheduled or regularly occurring transaction date. The unscheduled credential on file may be initiated by a merchant to fulfill a contract or instruction provided by the user in an initial user-initiated transaction. For example, a user may have a subscription with the merchant. The user may utilize the subscription to make various purchases (e.g., media purchase) using the merchant application or website. The merchant may send an automatic payment based on the user's purchases.

In some embodiments, credential on file transactions may be processed for Internet of Things (IoT) transactions or the like. Processing for these credential on file transactions may involve a provider of an IoT device. An IoT device may also be known as a smart device or the like.

In some cases, a merchant provided device may provide instructions to conduct a credential on file transaction. In one exemplary case, an IoT device, such as a printer device, may be operated by a cardholder. The printer device may provide instructions that trigger the printer manufacturer (e.g., merchant) to automatically ship new ink cartridges based on a prior recurring relationship set up between the printer manufacturer and a cardholder. In this case, credentials may be stored by the printer manufacturer and the credentials on file transactions may be unscheduled (e.g., based on depletion of ink cartridges).

In some cases, a merchant provided device may be capable of conducting credential on file transactions between a cardholder and a merchant upon request by a cardholder. In one exemplary case, a merchant provided device, such as an in-store kiosk device, may provide a push button that enables quick ordering of products. For example, the cardholder may request to order laundry detergent by activating the push button on the merchant provided device during their shopping trip. In this case, credentials may be stored by the merchant.

In some cases, a device provided by a third party may be capable of automatically conducting credential on file transactions with the merchant. In one exemplary case, an IoT device, such as a refrigerator device, can comprise an integrated sensor and may be able to order items (e.g., milk, juice, etc.) from a merchant (e.g., local supermarket). In another exemplary case, an IoT device, such as a printer device, may order items (e.g., paper, etc.) from a merchant (e.g., stationary store). In such cases, credentials may be stored by the device itself, in a cloud profile enabled by the device, or the merchant (e.g., wherein the device may store login information).

In some cases, a device provided by a third party may be capable of conducting credential on file transactions between a cardholder and a merchant upon request by a cardholder. In an exemplary case, an IoT device, a refrigerator device, may order items (e.g., milk, juice, etc.) from a merchant (e.g., local supermarket) upon instruction from a cardholder. In this case, credentials may be stored by the device itself, in a cloud profile enabled by the device, or the merchant (e.g., wherein the device may store login information).

A computer system may be utilized to implement any of the entities or components described above. Subsystems of the computer system may be interconnected via a system bus. Additional subsystems may include a printer, a keyboard, a fixed disk (or other memory comprising computer readable media), a monitor, which is coupled to a display adapter, and others. Peripherals and input/output (I/O) devices, which couple to an I/O controller (which can be a processor or other suitable controller), can be connected to the computer system by any number of means known in the art, such as by a serial port. For example, the serial port or external interface can be used to connect the computer apparatus to a wide area network such as the Internet, a mouse input device, or a scanner. The interconnection via system bus allows the central processor to communicate with each subsystem and to control the execution of instructions from system memory or the fixed disk, as well as the exchange of information between subsystems. The system memory and/or the fixed disk may embody a computer readable medium. In some embodiments, the monitor may be a touch sensitive display screen.

Specific details regarding some of the above-described aspects are provided above. The specific details of the specific aspects may be combined in any suitable manner without departing from the spirit and scope of embodiments of the technology. For example, back end processing, data analysis, data collection, and other transactions may all be combined in some embodiments of the technology. However, other embodiments of the technology may be directed to specific embodiments relating to each individual aspect, or specific combinations of these individual aspects.

It should be understood that the present technology as described above can be implemented in the form of control logic using computer software (stored in a tangible physical medium) in a modular or integrated manner. While the present invention has been described using a particular combination of hardware and software in the form of control logic and programming code and instructions, it should be recognized that other combinations of hardware and software are also within the scope of the present invention. Based on the disclosure and teachings provided herein, a person of ordinary skill in the art will know and appreciate other ways and/or methods to implement the present technology using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the technology will become apparent to those skilled in the art upon review of the disclosure. The scope of the technology should, therefore, be determined not with reference to the above description, but instead should be determined with reference to the pending claims along with their full scope or equivalents.

In some embodiments, any of the entities described herein may be embodied by a computer that performs any or all of the functions and steps disclosed.

One or more features from any embodiment may be combined with one or more features of any other embodiment without departing from the scope of the technology.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed:

1. A method comprising:
   receiving, by a server computer, an authorization request message for a transaction conducted by a user with a resource provider, wherein the authorization request message includes a credential on file indicator that indicates that a credential on file has been established between the user and the resource provider, wherein the credential on file indicator indicates a recurring transactional relationship between the user and the resource provider;

identifying, by the server computer, one or more data fields of the authorization request message, wherein the one or more data fields comprise the credential on file indicator;

determining, by the server computer, from the one or more data fields, that the authorization request message comprises the credential on file indicator that indicates the recurring transactional relationship between the user and the resource provider; and performing, by the server computer, additional processing in response to the determination of the credential on file indicator in the authorization request message that indicates that the user has been previously authenticated by the resource provider, wherein the additional processing comprises updating user account information that is associated with the credential on file indicator to indicate that the transaction is a credential on file transaction, and wherein the updated user account information is configured for processing a future transaction.

2. The method of claim 1, wherein the additional processing comprises at least one of performing an account update process using the credential on file indicator, performing a fraud analyses using the credential on file indicator, or performing token processing using the credential on file indicator.

3. The method of claim 2, further comprising:
sending, by the server computer, the authorization request message including the credential on file indicator to an authorization computer, wherein the authorization computer uses the credential on file indicator to determine whether to authorize the transaction.

4. The method of claim 3, wherein the authorization computer performs additional fraud analyses for the transaction using the credential on file indicator.

5. The method of claim 3, wherein a result of the fraud analyses performed by the server computer is sent with the authorization request message to the authorization computer, wherein the authorization computer uses the result to determine whether to authorize the transaction.

6. The method of claim 1, further comprising:
determining, by the server computer, based on the credential on file indicator that the transaction is being conducted as part of a recurring relationship between the user and the resource provider.

7. The method of claim 6, wherein the recurring relationship enables transactions between the user and the resource provider to be conducted in varying intervals and have varying transaction amounts.

8. The method of claim 7, wherein a resource provider computer associated with the resource provider stores credentials associated with the user.

9. The method of claim 8, wherein the user does not need to provide their credentials to the resource provider computer when conducting the transactions.

10. The method of claim 1, wherein the authorization request message is an ISO 8583 message.

11. A server computer comprising:
a processor; and
a computer-readable medium coupled to the processor, the computer-readable medium comprising code, executable by the processor, for performing a method comprising:

receiving an authorization request message for a transaction conducted by a user with a resource provider, wherein the authorization request message includes a credential on file indicator that indicates that a credential on file has been established between the user and the resource provider, wherein the credential on file indicator indicates a recurring transactional relationship between the user and the resource provider;

identifying, by the server computer, one or more data fields of the authorization request message, wherein the one or more data fields comprise the credential on file indicator;

determining, from the one or more data fields, that the authorization request message comprises the credential on file indicator that indicates the recurring transactional relationship between the user and the resource provider; and performing additional processing in response to the determination of the credential on file indicator in the authorization request message that indicates that the user has been previously authenticated by the resource provider, wherein the additional processing comprises updating user account information that is associated with the credential on file indicator to indicate that the transaction is a credential on file transaction, and wherein the updated user account information is configured for processing a future transaction.

12. The server computer of claim 11, wherein the additional processing comprises at least one of performing an account update process using the credential on file indicator, performing a fraud analyses using the credential on file indicator, or performing token processing using the credential on file indicator.

13. The server computer of claim 12, the method further comprising:
sending the authorization request message including the credential on file indicator to an authorization computer, wherein the authorization computer uses the credential on file indicator to determine whether to authorize the transaction.

14. The server computer of claim 13, wherein the authorization computer performs additional fraud analyses for the transaction using the credential on file indicator.

15. The server computer of claim 13, wherein a result of the fraud analyses performed by the server computer is sent with the authorization request message to the authorization computer, wherein the authorization computer uses the result to determine whether to authorize the transaction.

16. The server computer of claim 11, the method further comprising:
determining based on the credential on file indicator that the transaction is being conducted as part of a recurring relationship between the user and the resource provider.

17. The server computer of claim 16, wherein the recurring relationship enables transactions between the user and the resource provider to be conducted in varying intervals and have varying transaction amounts.

18. The server computer of claim 17, wherein a resource provider computer associated with the resource provider stores credentials associated with the user.

19. The server computer of claim 18, wherein the user does not need to provide their credentials to the resource provider computer when conducting the transactions.

20. The server computer of claim 11, wherein the authorization request message is an ISO 8583 message.

\* \* \* \* \*